United States Patent [19]

Tokas

[11] 4,267,282
[45] May 12, 1981

[54] MINIMIZING FEED PROBLEMS AND REDUCING RESIDUAL ACRYLONITRILE MONOMER IN PROCESSING NITRILE POLYMERS

[75] Inventor: Edward F. Tokas, West Hatfield, Mass.

[73] Assignee: Monsanto Company, St. Louis, Mo.

[21] Appl. No.: 943,566

[22] Filed: Sep. 18, 1978

[51] Int. Cl.$^3$ .......................... C08L 9/02; C08L 55/02
[52] U.S. Cl. ..................................... 525/86; 260/4 R; 525/75; 525/76; 525/77; 525/79; 525/80; 525/83; 525/87; 525/193; 525/198; 525/210; 525/213; 525/217; 525/222; 525/231; 525/234; 525/235; 525/237; 525/238; 525/239; 525/240; 525/241; 525/243; 525/313; 525/315; 525/316

[58] Field of Search ................... 260/876 R, 887, 888, 260/4 R; 525/242, 310, 316, 75, 76, 77, 79, 80, 83, 86, 87, 193, 210, 213, 217, 222, 234, 235, 237, 238, 239, 240, 241, 242, 243, 313, 315, 316

[56] References Cited

U.S. PATENT DOCUMENTS

| 2,382,803 | 8/1945 | Miller et al. | 560/128 |
| 3,438,971 | 4/1969 | Walker | 260/876 R |

*Primary Examiner*—J. Ziegler
*Attorney, Agent, or Firm*—Michael J. Murphy

[57] ABSTRACT

In the process of melting a blend of nitrile polymer and lubricous additive with a screw-plasticizing unit, the improvement which involves having an absorptive anti-slip agent such as rubber crumb in admixture with the blend when charging the plasticator to minimize feeding problems.

12 Claims, No Drawings

MINIMIZING FEED PROBLEMS AND REDUCING RESIDUAL ACRYLONITRILE MONOMER IN PROCESSING NITRILE POLYMERS

CROSS REFERENCE TO RELATED APPLICATIONS

1. "Nitrile Preforms And Containers And Process Improvements For Forming Same", Morris Salame, Samuel Steingiser, Ser. No. 850,364, filed Nov. 10, 1977.

2. "Chemically Reducing Residual Acrylonitrile Monomer In Nitrile Polymers And Shaped Packaging Materials Formed Thereby", Edward F. Tokas, Ser. No. 943,565 filed Sept. 18, 1978, U.S. Pat. No. 4,221,878.

BACKGROUND OF THE INVENTION

This invention relates to process improvements in melting nitrile polymers and more particularly to the use of additives with the polymer to minimize problems associated with such melting.

In commonly owned, copending application Ser. No. 943,565, filed Sept. 18, 1978, a chemical scavenger in the form of myrcene compound is disclosed to regulate or neutralize the amount of free, acrylonitrile monomer (AN) present during conversion to melt form of a nitrile polymer containing polymerized acrylonitrile monomer preparatory to shaping the melt into a product. Though such compound performs well in regulating AN, it is lubricous by nature and causes feeding problems when a nitrile polymer-myrcene additive blend is charged to a rotary screw-plasticator unit used to carry out such melting. More specifically, the mixture slips on and resists frictional engagement with the surface of the worm screw. The problem is especially aggravated when the polymer particles are in the form of spherical beads having a pronounced tendency to roll on themselves when rubbed together.

SUMMARY OF THE INVENTION

Now improvements have been developed which substantially eliminate such feeding problems without adversely affecting the ability of myrcene to scavenge residual acrylonitrile monomer (RAN).

Accordingly, it is the principal object of this invention to provide process improvements to minimize problems associated with feeding a blend of nitrile polymer and lubricous additive to a rotating screw-plasticator, and more specifically to eliminate such problems when liquid myrcene is the polymer additive.

Other objects of this invention will in part be obvious and will in part appear from the following description and claims.

These and other objects are provided in the process of melting a blend of nitrile polymer and lubricous additive by means of a screw rotating within a plasticator by providing the improvement which comprises having an absorptive anti-slip agent in admixture with the blend when charging the blend to the plasticator, such anti-slip agent being employed in an amount sufficient to reduce slippage of the blend on the surface of the rotating screw.

In a more specific aspect, it has been unexpectedly discovered that in the process of melting a nitrile polymer containing at least about 10 weight percent polymerized acrylonitrile, the improvement can be provided of having a scavenging amount of rubber crumb in intimate admixture with the polymer during melting to minimize the level of free acrylonitrile monomer in the polymer.

PREFERRED EMBODIMENTS

Nitrile polymers useful in the present invention contain at least about 10 percent by weight of polymerized AN and one or more comonomers copolymerizable with the AN in particulate (i.e. powder, pellet, bead or the like) form. Such comonomers include:

(a) the monovinylidene aromatic hydrocarbon monomers of the formula:

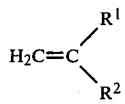

wherein $R^1$ is hydrogen, chlorine or methyl and $R^2$ is an aryl group of 6 to 10 carbon atoms which may also contain substituents such as halogen as well as alkyl groups attached to the aromatic nucleus, e.g. styrene, alpha methylstyrene, vinyl toluene, alpha chlorostyrene, ortho chlorostyrene, meta chlorostyrene, para chlorostyrene, ortho methylstyrene, para methylstyrene, ethyl styrene, isopropyl styrene, dichloro styrene, vinyl naphthalene, etc.

(b) lower alpha olefins of from 2 to 8 carbon atoms, e.g. ethylene, propylene, isobutylene, butene-1, pentene-1 and their halogen and aliphatic substituted derivatives, e.g. vinyl chloride, vinylidene chloride, etc.

(c) acrylic acid and methacrylic acid and the corresponding acrylate and methacrylate alkyl esters where the alkyl group contains from 1 to 4 carbon atoms, e.g. methyl acrylate, ethyl acrylate, propyl acrylate, methyl methacrylate, etc.

(d) vinyl esters of the formula:

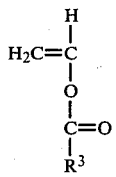

wherein $R^3$ is hydrogen, an alkyl group of from 1 to 10 carbon atoms, an aryl group of 6 to 10 carbon atoms, e.g. vinyl formate, vinyl acetate, vinyl propionate, vinyl benzoate, etc.

(e) vinyl ether of the formula:

wherein $R^4$ is an alkyl group of from 1 to 8 carbon atoms, an aryl group of from 6 to 10 carbon atoms or a monovalent aliphatic radical of from 2 to 10 carbon atoms, which aliphatic radical may be hydrocarbons or oxygen-containing, i.e. an aliphatic radical with ether linkages and may also contain other substituents such as halogen, carbonyl, etc. Examples of these monomeric vinyl ethers include vinyl methyl ether, vinyl ethyl ether, vinyl n-butyl ether, vinyl 2-chloroethyl ether, vinyl phenyl ether, vinyl cyclohexyl ether, 4-butyl cyclohexyl ether, and vinyl p-chlorophenylene glycol ether, etc.

(f) olefinically unsaturated mononitriles having the formula:

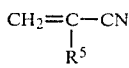

wherein $R^5$ is an alkyl group having 1 to 4 carbon atoms or a halogen. Such compounds include methacrylonitrile; ethacrylonitrile; propioacrylonitrile, alpha chloroacrylonitrile, etc.

Additional comonomers useful in the practice of this invention are those comonomers which contain a mono- or dinitrile function. Examples of these include methylene glutaronitrile, 2,4-dicyanobutene-1, vinylidene cyanide, crotonitrile, fumaronitrile, maleonitrile.

Preferred comonomers are the monovinylidene aromatic hydrocarbons, lower alpha olefins, acrylic and methacrylic acid and the corresponding acrylate and methacrylate esters, with the monovinylidene aromatic hydrocarbons being more particularly preferred. Most specifically preferred is styrene and alpha methylstyrene. Another preferred composition is a terpolymer of acrylonitrile, styrene and vinyl ether such as disclosed in U.S. Pat. No. 3,863,014.

The amount of comonomer, as defined above, present in the nitrile composition can vary up to about 90 percent by weight based on the total weight of the nitrile polymer composition. Preferred nitrile compositions for packaging applications requiring good to excellent oxygen and water vapor barrier properties in the packaging materials contain from at least about 50 percent, e.g. about 50 to 90 percent by weight of polymerized acrylonitrile monomer and from about 10 to about 50 percent by weight of comonomer and more preferably from about 55 to about 85 percent by weight of acrylonitrile monomer and from about 15 to about 45 percent by weight of comonomer, all based on the total polymer weight.

Nitrile polymers within the scope of this invention may also contain an elastomer in the form of a synthetic or natural rubber component such as polybutadiene, isoprene, neoprene, nitrile rubbers, natural rubbers, acrylonitrile-butadiene copolymers, ethylene-propylene copolymers, chlorinated rubbers, etc. which are used to strengthen or toughen products such as shaped packaging materials. This rubber component may be incorporated into the nitrile polymer by direct polymerization of monomers, grafting the acrylonitrile monomer mixture onto the rubbery backbone, etc. Generally, such rubber component may comprise from 0 to about 25 percent and preferably up to about 10 percent by weight of the nitrile polymer composition.

The active treating ingredient for reducing the free AN monomer content of the nitrile polymer is myrcene having the formula 3 methylene-7-methyl-1, 6 octadiene. Myrcene is a terpene hydrocarbon which has U.S. Food and Drug Administration (FDA) approval as a food additive. It has the form of a colorless, lubricous liquid at room temperature having a boiling point of 67° C. and a balsomic resinous odor. In place of pure, natural myrcene which occurs as a constituent of bay oil and other essential oils, or pure synthetic myrcene it is possible to employ materials rich in myrcene. For example, the pyrolysis of beta pinene yields mixtures containing as much as 77 weight percent myrcene in conjunction with minor quantities of limonene and other complex terpenes.

The amount of myrcene used in the present invention is calculated to reduce the free residual acrylonitrile monomer (RAN) in the nitrile polymer after melting to less than about 7 ppm and preferably to less than about 3 ppm. Allowance should be made for vaporization of some of the admixed myrcene during melting of the nitrile polymer. In general, the scavenging or regulating amount of myrcene required to achieve this reduction in RAN content will be in the range of from about 0.005 to about 2.0 percent by weight based on the weight of the nitrile polymer. In most applications the amount of myrcene will be in the range of from about 0.01 to about 1.5 percent by weight. When using a compound which contains or yields myrcene or else behaves as a myrcene donor, the amount of such myrcene compound is calculated so as to provide an amount of myrcene within the preceding ranges.

The ingredient minimizing or eliminating problems associated with feeding nitrile polymers to a rotating screw-plasticating unit when the polymers contain one or more admixed lubricous additives such as lubricous chemical scavengers or regulators of free monomer (e.g. AN monomer) is an absorptive anti-slip agent preferably somewhat fluffy in form. Without such an agent the lubricous additive remains on the surface of the nitrile polymer with the result that the mixture builds up in the relatively cool feed zone of the plasticator such that the screw just rotates therein without building up enough thrust to push the polymer ahead of it forward. The fluffy, absorptive anti-slip agent will be a non-lubricant, capable because of its absorptive capacity of holding the lubricous additive within self-contained voids to minimize intimate admixture of additive and polymer during the early stages of melting thus avoiding slippage on the screw caused by the additive. Thereafter, however, after the polymer has passed the early stages of melting, the anti-slip agent containing the lubricous agent itself becomes fluid thus allowing the lubricant to be well distributed in the polymer and available to perform its intended function. In this respect the anti-slip agent should have a bulk density of from about 32 to about 800 kg./m.$^3$ and preferably from about 80 to about 320 kg./m.$^3$.

In a more specific aspect, compositional differences between the nitrile polymer and anti-slip agent can result in index of refraction differences and this can cause deterioration in the optical properties of the end product, for example haze and color. Though this may not be of concern when such properties are unimportant, as for example when the material is pigmented, such optical properties are important when the nitrile polymer is to be used in clear packaging applications such as when in the form of sheet, film, tubs, cups, containers such as bottles or jars, preforms for forming any of the foregoing products, and the like. In this respect, when such end products are contemplated, the nitrile polymer and anti-slip agent must be compatible in that the index of refraction of the anti-slip agent should be within about 0.1 to 5 percent of that of the nitrile polymer and preferably should be essentially matched therewith.

Any polymeric material satisfying the foregoing criteria and depending on the particular end application contemplated can be used as the anti-slip agent in the present invention. Typical of such materials are various rubbers such as diene rubbers, e.g. polybutadiene, natural rubbers, ethylene-propylene terpolymer rubbers, acrylate rubbers, polyisoprene rubbers and mixtures thereof as well as interpolymers thereof with each other or other copolymerizable monomers. Also, ABS resins containing styrene and acrylonitrile grafted to polybutadiene and coagulated to provide the desired degree of bulk density in a dry state, polyvinylchloride resins, SAN resins containing 10-90 percent styrene/90-10 percent acrylonitrile by weight, styrene and acrylic (for example methyl methacrylate) homopolymers, etc. The preferred anti-slip agent for packaging materials are ABS resins containing from about 10-60 weight percent styrene and 90-40 weight percent acrylonitrile SAN copolymer grafted onto about 10-60 weight percent butadiene. Such material will have a bulk density of about 5 to about 20 lbs./ft.$^3$ (80-320 kg./m.$^3$) and an index of refraction of about 1.5000 to about 1.6100.

The amount of anti-slip agent used in the present invention in the presence of a lubricous additive, such as the chemical scavenger myrcene for AN monomer, to minimize the aforementioned feeding problems will be in the range of from about 0.25 to about 20 percent by weight based on the weight of the nitrile polymer charged to the plasticator. In most applications, the amount will be in the range of from about 0.5 to about 15 percent by weight. When rubber crumb which functions as an anti-slip agent as will be shown, is used as the sole scavenging agent for RAN, the amount should be sufficient to reduce the RAN in the nitrile polymer by at least about twenty-five percent (25%) versus that present in the polymer before initial melting. Such latter amount will be in the range of from about 1.0 to about 15 percent by weight based on the weight of the nitrile polymer and preferably between about 5 to about 12 percent by weight.

The nitrile polymer melting operation with which the present invention is primarily concerned is carried out utilizing a conventional plasticator unit employing a worm screw rotating within a barrel to masticate the polymer wherein the screw is either axially fixed or reciprocable, the latter occurring for example in an injection molding system. In the melting step the nitrile polymer is converted from solid to melt form by physical working at temperatures in the range of from about 93° to about 274° C. and is usually then immediately formed into some useful shape such as pellets, rods, tubular formations, sheet, film, tubs, cups and the like. The latter or select ones thereof optionally may be reshaped into further products such as bottles, jars and other hollow bodies.

The actual measurement of the amount of RAN in products formed of nitrile polymers is not considered part of this invention. In this regard any method capable of detecting AN monomer in products of nitrile polymers to 1 ppm can be used. Such methods, which are known to those in the art, include polarographic, gas chromatographic, and electrochemical measurements. A method for measuring RAN in nitrile polymers to 1 ppm is available to the public upon request from the U.S. Food and Drug Administration and is described in and a part of Food and Drug Administration Regulation No. 121.2629 which is referenced in The Federal Register, Vol. 40, No. 30.

The present invention also contemplates the use of other additives and ingredients in the polymeric compositions which do not adversely affect the properties of the resulting shaped products. Examples of these ingredients include thermal stabilizers, light stabilizers, dyes, pigments, plasticizers, fillers, antioxidants, lubricants, extrusion aids, etc.

The following examples are set forth in illustration of the invention and should not be construed as limitations thereof. All parts and percentages of resin, rubber crumb and myrcene compound are by weight unless otherwise specified. Wherever convenient, residual acrylonitrile monomer is abbreviated as RAN. The amount of myrcene and rubber crumb compound are based on the weight of the nitrile polymer. A dash in a Table means that particular product was not tested or observed.

EXAMPLES 1 TO 8

A copolymer in bead form containing 68 percent polymerized AN and 32 percent polymerized styrene prepared by conventional aqueous polymerization methods is dry blended with (a.) various scavenging amounts of myrcene and (b.) anti-slip amounts of a coagulated and dried rubber crumb latex according to a mixing procedure outlined below. The refractive index of the nitrile polymer is 1.5367 whereas that of the rubber crumb is 1.5300-1.5400. The bulk density of the rubber crumb is about 240 kg./m.$^3$ (15 lbs./ft.$^3$). No reground nitrile material is used in the blends. The blends are converted from solid to melt form by physically working the polymer in multiple pass extrusion runs with a conventional plasticator in the form of a one inch extruder having a 16:1 L/D ratio fitted with a rotary two stage screw operating at 70 r.p.m. and a cutting mechanism associated with the outlet die to form pellets. Zone temperatures of the extruder are set to provide a melt stock temperature of approximately 254° C. After each pass, pellet samples are analyzed for RAN content with the results of these tests tabulated in Table I below. Processibility is visually determined from the standpoint of extruder feeding.

TABLE I

SUMMARY OF EXAMPLES 1 TO 8

| Ex. | Sample | % Additive | Mixing Procedure* | RAN In Starting Beads (ppm) | RAN (ppm) 1 Pass | 2 Passes | 3 Passes | Extruder Feeding |
|---|---|---|---|---|---|---|---|---|
| 1 | Control | 0 | — | <1 | 9.8 | 12.6 | 14.0 | Excellent |
| 2 | Rubber Crumb** | 11.1 | 0 | <1 | 8.8 | 12.4 | 14.7 | Excellent |
| 3 | Rubber Crumb** | 11.1 | 0 | <1 | 4.1 | 4.6 | 4.6 | Excellent |
| 4 | Myrcene | 1.0 | 0 | <1 | 2.5 | 2.6 | 3.0 | Poor |
| 5 | Myrcene | 1.0 | 1 | <1 | 4.6 | 5.3 | 6.3 | Excellent |
|   | Rubber Crumb** | 11.1 |   |   |   |   |   |   |
| 6 | Myrcene | 1.0 | 2 | <1 | 3.2 | 1.7 | 4.8 | Excellent |
|   | Rubber Crumb** | 11.1 |   |   |   |   |   |   |
| 7 | Myrcene | 1.0 | 2 | <1 | 2.8 | — | 2.6 | Excellent |
|   | Rubber Crumb** | 5.5 |   |   |   |   |   |   |
| 8 | Myrcene | 1.0 | 2 | <1 | 2.0 | — | 3.8 | Excellent |

TABLE I-continued
SUMMARY OF EXAMPLES 1 TO 8

| Ex. | Sample | % Additive | Mixing Procedure* | RAN In Starting Beads (ppm) | RAN (ppm) 1 Pass | RAN (ppm) 2 Passes | RAN (ppm) 3 Passes | Extruder Feeding |
|---|---|---|---|---|---|---|---|---|
| | Rubber Crumb** | 2.7 | | | | | | |

*0 The beads were weighed into a polyethylene bag followed by addition of myrcene or rubber crumb with vigorous shaking for 5 minutes.
1 Myrcene was mixed with rubber crumb and this mixture added to the polymer beads.
2 Myrcene was mixed with the polymer beads and to this is added the rubber crumb.
**Rubber crumb is a fluffy, absorptive rubber graft material of composition:
 butadiene - 30-34%
 styrene - 38-42%
 acrylonitrile - 16-20%
 methyl methacrylate - 8-10%
 ethylene glycol dimethyl acrylate - 5-1.0%

A review of the above data illustrates that processibility problems as regards extruder feeding can be eliminated without reducing the RAN scavenging effect of myrcene by incorporating a minor amount of rubber crumb into the nitrile polymer beads—myrcene charge to the extruder. A comparison of the RAN results of Example 5 with those of Examples 6 to 8 reveals a preferred mixing sequence (Mixing Procedure 2) for preparing the blends which results in optimizing the scavenging ability of the myrcene—i.e. first the nitrile polymer beads are thoroughly mixed with the myrcene and then the rubber crumb is added to the beads/myrcene mixture and mixed to evenly distribute the crumb.

The above data also illustrates (Examples 2 and 3 versus 1) a certain degree of RAN scavenging capability in the rubber material per se in the absence of any other RAN scavenger without any deterioration in screw feeding capability. The discrepancy between Examples 2 and 3 is believed due to temperature variations in the extruder controls in that if the melt reaches too high a temperature (Example 2) the rubber crumb per se seems to lose its scavenging effectiveness.

EXAMPLES 9 TO 15

The following Examples 9 to 15 illustrate the present invention in feeding polymer blends to a rotating, reciprocating screw injection molding machine. Nitrile polymer of the type used in Examples 1 to 8 is dry blended with various amounts of myrcene compound and rubber crumb of the type used in Examples 1 to 8 according to Mixing Procedure 2 of Examples 6 to 8 and then injection molded in a commercial size injection molding machine employing a reciprocating and rotating worm screw plasticator at temperatures in the range of from about 230° to about 270° C. into hollow, tubular preforms of circular cross section closed at one end and having a molded finish at the other end. After cooling to room temperature, the preforms shaped as just described are reheated to a molecular orientation molding temperature of about 132° to 138° C. and then distended in a conventional blow mold into 32 ounce (950 cc.) bottles. The level of RAN in the bottles is then determined. The results of these tests are tabulated in Table II below. Processibility is visually determined from the standpoint of feeding the screw of the injection molding plasticator.

TABLE II
SUMMARY OF EXAMPLES 9 TO 15

| Ex. | Sample | Wt. % Additive | RAN (ppm) Beads | RAN (ppm) Bottle | Injection Molder Feeding | Bottle Optical Quality* |
|---|---|---|---|---|---|---|
| 9 | Control A | — | <1 | 8.3 | — | Fair | A |
| | Control B | — | <1 | — | 9.8 | — | — |
| 10 | Myrcene | 1.0 | <1 | 1.9 | — | Poor | A |
| 11 | Rubber Crumb | 1.0 | <1 | — | 8.0 | Fair | — |
| | Myrcene | 0.25 | | | | | |
| 12 | Rubber Crumb | 1.0 | <1 | — | 9.8 | Good | — |
| | Myrcene | 0.5 | | | | | |
| 13 | Rubber Crumb | 2.0 | <1 | — | 2.7 | Good | — |
| | Myrcene | 1.0 | | | | | |
| 14 | Rubber Crumb | 3.0 | <1 | 3.6 | — | Good | A |
| | Myrcene | 1.0 | | | | | |
| 15 | Rubber Crumb | 5.0 | <1 | 3.4 | — | Excellent | A |
| | Myrcene | 1.0 | | | | | |

*A = Control with quality as excellent; D = Poor; B and C would be intermediate A and D.

A review of the above data illustrates that processibility problems as regards feeding a rotating screw in a commercial size injection molding machine can be minimized or eliminated without reducing the RAN scavenging effect of myrcene by incorporating minor amounts of from about 1.0 to about 5 percent of rubber crumb into the nitrile polymer beads/myrcene charge to the injection molder screw. In all examples tested, bottle optical quality in terms of haze and color was equal to that of the control.

To the best of applicant's knowledge, substitution of nitrile polymers containing levels of polymerized AN down to about 10 percent and specifically to about 20 percent, the latter being known as styrene/acrylonitrile (SAN) resins, as well as copolymers of styrene and acrylonitrile containing an elastomer which are known as ABS resins, for those of the foregoing examples should eliminate screw feed problems while providing comparable low level regulation of RAN in the melted resin and shaped products at comparable starting levels of free AN in the initial raw material polymer.

The preceding description is set forth for purposes of illustration only and is not to be taken in a limited sense. Various modifications and alterations will be readily suggested to persons skilled in the art. It is intended, therefore, that the foregoing be considered as examplary only and that the scope of the invention be ascertained from the following claims.

What is claimed is:

1. In the process of melting a blend of nitrile polymer and liquid myrcene by means of a rotating plasticizing element, the improvements which comprise having an absorptive, anti-slip agent in admixture with the blend when charging the blend to the plasticator, said anti-slip agent being employed in an amount sufficient to reduce slippage of the blend on the surface of the rotating screw and then melting the anti-slip agent along with the polymer to form a fluid melt of polymer, anti-slip agent and myrcene.

2. The process of claim 1 wherein the nitrile polymer is initially in bead form.

3. The process of claim 1 wherein the anti-slip agent has a bulk density of about 80 to about 320 kg./m.$^3$.

4. The process of claim 1 wherein the anti-slip agent is rubber crumb material comprising polymer containing styrene and acrylonitrile grafted onto a substrate comprising polymerized butadiene.

5. The process of claim 4 wherein the nitrile polymer contains free acrylonitrile monomer and the myrcene is present in amount sufficient to reduce the free acrylonitrile monomer content of the nitrile polymer.

6. The process of claim 5 further comprising the following steps before charging the blend to the plasticator:
 (i) mixing the beads and myrcene; and
 (ii) adding the anti-slip agent in the form of rubber crumb to the resulting mixture to form the blend.

7. The process of any of claims 1, 2, 3, 4, 5 or 6 wherein the nitrile polymer comprises at least about 50 weight percent polymerized acrylonitrile.

8. In the process of converting a nitrile polymer containing at least about 10 weight percent polymerized acrylonitrile into melt form by means of a rotating plasticizing element while minimizing buildup of free acrylonitrile monomer, the improvement which comprises having a blend of rubber crumb and an acrylonitrile monomer scavenger in the form of liquid myrcene in intimate admixture with the polymer during said converting, said myrcene being present in an amount sufficient to reduce the free acrylonitrile monomer in the polymer to less than about 7 ppm and said rubber being present in an amount sufficient to reduce slippage on the surface of the rotating element.

9. The process of claim 8 wherein the myrcene is present at a concentration of from about 0.005 to about 2 weight percent based on the weight of the polymer.

10. The process of claim 9 wherein the rubber crumb is present at a concentration of from about 0.5 to about 15 weight percent based on the weight of the polymer.

11. The process of claim 10 further comprising the following steps in preparing the blend for charging to the plasticizing element:
 (i) mixing the polymer and myrcene; and
 (ii) adding the rubber crumb to the resulting mixture.

12. The process of claims 9, 10 or 11 wherein the nitrile polymer comprises at least about 50 weight percent polymerized acrylonitrile.

* * * * *